Sept. 17, 1957 J. WEICHERT 2,806,296
LEVEL ATTACHMENT FOR A PORTABLE ELECTRIC DRILL
Filed July 13, 1956 2 Sheets-Sheet 1
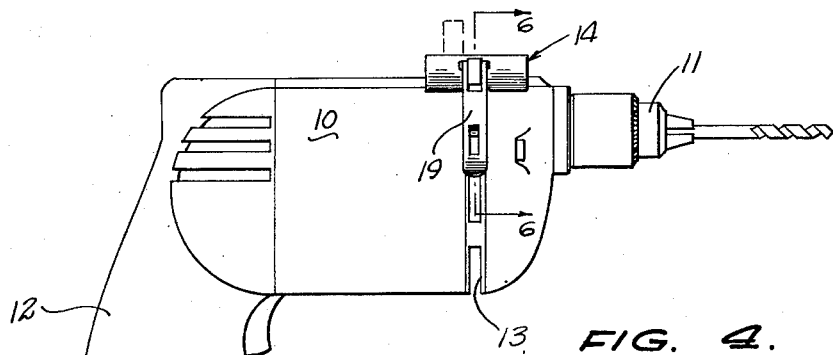
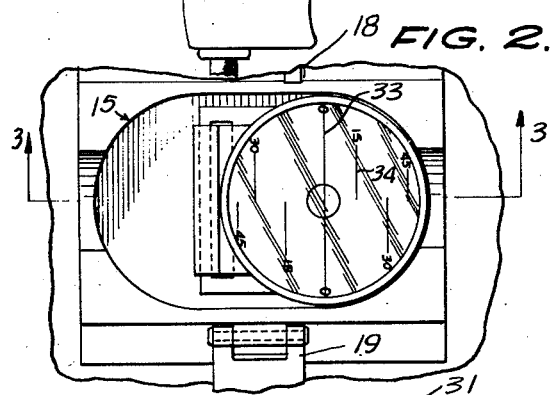
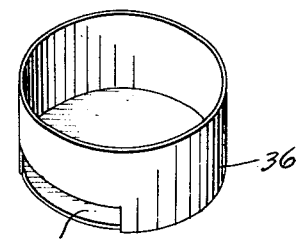
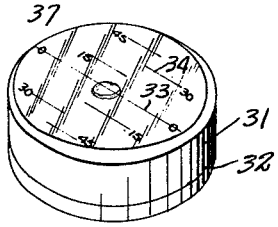
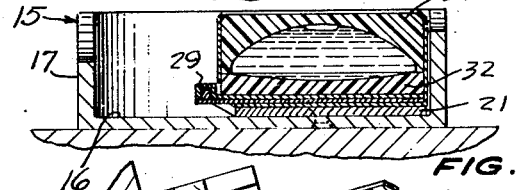
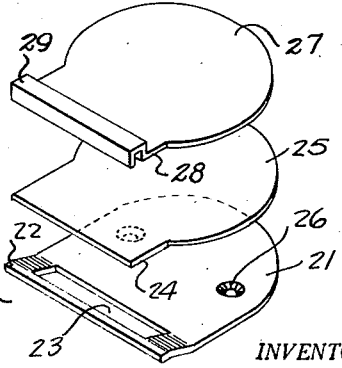
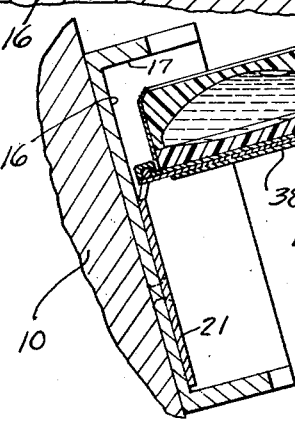
INVENTOR.
JOSEPH WEICHERT,
BY
McMorrow, Berman + Davidson
ATTORNEYS.

Sept. 17, 1957  J. WEICHERT  2,806,296
LEVEL ATTACHMENT FOR A PORTABLE ELECTRIC DRILL
Filed July 13, 1956  2 Sheets-Sheet 2
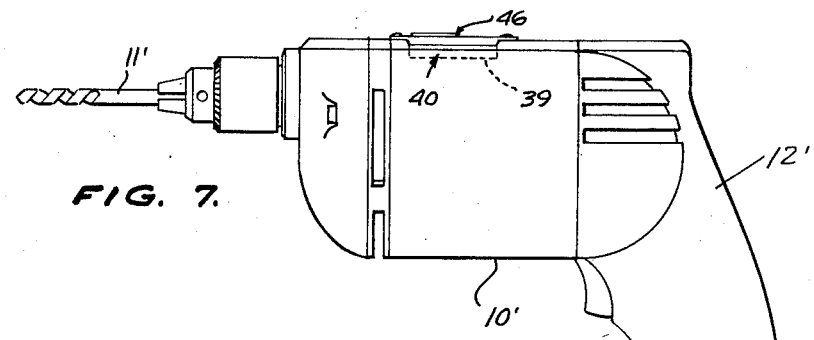
FIG. 7.
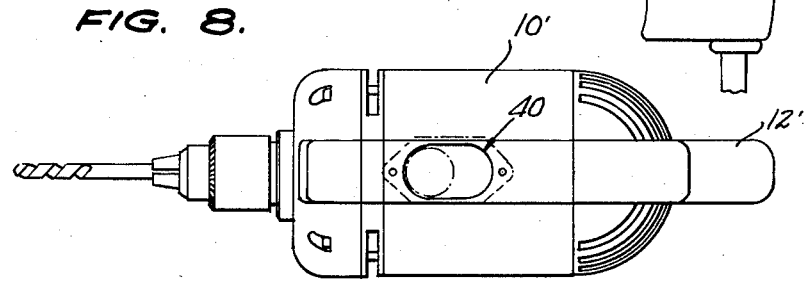
FIG. 8.
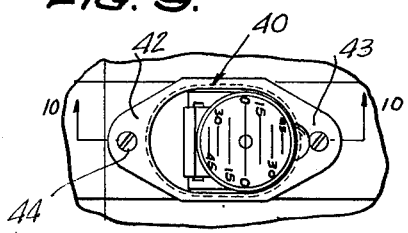
FIG. 9.
FIG. 11.   FIG. 12.
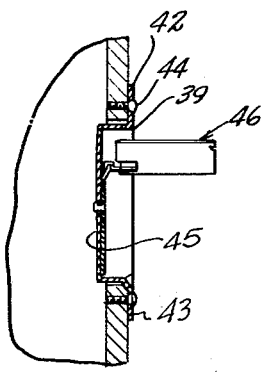
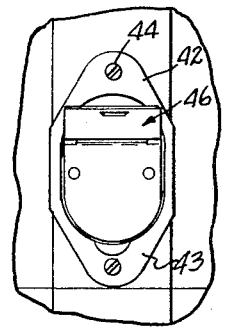
FIG. 10.
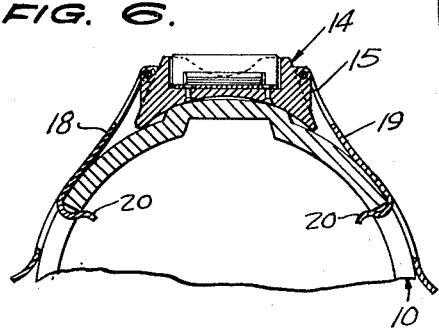
FIG. 6.
INVENTOR.
JOSEPH WEICHERT,
BY
McMorrow, Berman + Davidson
ATTORNEYS.

2,806,296

LEVEL ATTACHMENT FOR A PORTABLE ELECTRIC DRILL

Joseph Weichert, Tallmadge, Ohio

Application July 13, 1956, Serial No. 597,778

3 Claims. (Cl. 33—207)

The present invention relates to a level attachment for a portable electric drill.

An object of the present invention is to provide a level attachment for a portable electric drill which enables the drill operator to guide the drill at any angle to the horizontal, one which is attached to the drill in such a way that it is protected from breakage, one having few parts economical to manufacture and assemble, and one which is highly effective in action.

Another object of the present invention is to provide a level attachment for a portable electric drill which permits the operation of the drill in a horizontal, as well as a vertical direction, one which is sturdy in structure and one which may be manufactured of light metal, plastics, or the like.

These and other objects and advantages of the present invention will be fully apparent from the following description when taken in connection with the annexed drawings, in which:

Figure 1 is a side elevational view of a portable electric drill with the level attachment installed thereon, Figure 2 is a top plan view on an enlarged scale of the level attachment shown in Figure 1, Figure 3 is a sectional view taken on the line 3—3 of Figure 2, Figure 4 is a perspective exploded view of a bubble assembly of the level attachment.

Figure 5 is a sectional view similar to Figure 3 showing the bubble assembly swung to a nearly horizontal position with the drill housing swung to a nearly vertical position, Figure 6 is a sectional view on an enlarged scale taken on the line 6—6 of Figure 1, Figure 7 is an elevational view of another electric drill showing a second form of the level attachment of the present invention installed thereon, Figure 8 is a plan view of the assembly shown in Figure 7, Figure 9 is a plan view on an enlarged scale of the level attachment shown in Figures 7 and 8, Figure 10 is a sectional view taken on the line 10—10 of Figure 9, Figure 11 is a sectional view showing the bubble assembly swung to a horizontal position with the drill housing in a vertical position, Figure 12 is an elevational view of the assembly shown in Figure 11.

Referring in greater detail to the drawings, in which like numerals indicate like parts throughout the several views, the level attachment of the present invention is for use in combination with a portable electric drill, designated by the reference numeral 10, and having a housing including a top and opposed ends with a drill chuck 11 projecting longitudinally from one of the ends and a pistol-type hand grip 12 projecting from the other end of the housing, the latter being provided with vent slots, as at 13, extending on opposed sides of the top of the housing intermediate the drill chuck 11 and the hand grip 12.

The level attachment of the present invention is indicated generally by the reference numeral 14 and comprises a shallow receptacle 15 having a flat bottom 16 and an upstanding wall 17 extending about the perimeter of the bottom 16 and formed integrally therewith. The receptacle 15 is horizontally disposed between the drill chuck 11 and the hand grip 12 with the wall 17 facing away from the top of the housing of the drill 10 and with the bottom 16 of the receptacle 15 supported upon the top of the housing of the drill 10.

Detachable means is provided for securing the receptacle 15 to the top of the housing of the drill 10 and specifically, this means embodies clamp elements 18 and 19, one on each side of the receptacle 15, and having one end of each pivotally connected to the exterior face of the wall 17 of the receptacle 15 and as shown in Figure 6, each of the clamp elements 18 and 19 being provided with a hook formation, as at 20, engaged in the vent slots 13 and detachably securing the receptacle 15 on the housing of the drill 10.

Within the receptacle 15 is a flat horizontally disposed support plate 21 resting upon and fixedly secured to the flat bottom 16 of the receptacle 15 and having an upwardly bent portion spaced from the receptacle wall 17, as indicated by the reference numeral 22.

The portion 22 of the plate 21 is slotted, as at 23, to receive the tongue 24 of a reinforcing plate 25 which is positioned in superimposed abutting relation when the bubble assembly is assembled within the receptacle 15. The plate 21 is provided with a countersunk hole 26 for receiving a machine screw for securing it to the receptacle bottom 16. The bubble assembly comprises a flat base plate 27 of a size substantially the same as the support plate 21 and has a tongue portion 28 terminating in an inverted U-shaped channel member 29 of such length as to snugly fit over the portion of the support plate portion 22 adjacent to the slot 23 therein.

The bubble assembly includes an upstanding lower concave section 32 and an inverted upper concave section 31 superimposed upon and having the lower face abutting the upper face of the lower section 32 providing a closed cavity, the upper section 31 embodying a viewing glass having a center line marking and a plurality of angle scale markings on each side of the center line marking, as shown in Figure 2 and indicated by the reference numerals 33 and 34, respectively. It is an important feature of the invention that the section 32 of the bubble assembly be concave on its upper surface, so that during the manufacture of the bubble assembly, liquid introduced into the inverted section 31 is retained therein by the assembly of the section 32 upon the section 31, the concave surface of the section 32 providing the necessary bubble 35 and of a size to sharply delineate the angular position of the bubble assembly as read through the viewing glass having the markings 33 and 34 thereon.

A skirt 36 rises from the base plate 27 and is provided with a slot 37 through which projects the tongue portion 28. The skirt 36 surrounds the bubble assembly sections 31 and 32 and retains them in their positions in which the top of the section 31 is adjacent the top of the receptacle wall 17 when the bubble assembly is in the position shown in Figure 3.

The engagement of the channel shaped member 29 with the portion of the support plate portion 22 constitutes a hinge connection of the support plate 21 to the base plate 27 and permits the bodily movement of the bubble assembly from the horizontal position shown in Figure 3 to a vertical position with respect to the support plate 21, as shown in Figure 5. The skirt 36 of the bubble assembly has a flap portion 38 extending under the reinforcing plate 25, as shown in Figure 5.

In Figure 7, another drill 10' is shown in which there is provided a well 39 in the top of the housing of the drill 10' intermediate the drill chuck 11' and the hand grip 12'. In this form of the invention, the receptacle 40 sits within the housing well 39 with the wall 41 of the receptacle 40 facing away from the well 39.

Detachable means is provided, securing the receptacle 40 to the top of the housing of the drill 10'. Specifically, this means consists in flanges 42 and 43 projecting from opposite ends of the receptacle wall 41 and fixed by screws 44 to the drill housing, there being provided tapped holes receiving the screws 44.

The bubble assembly of this form of the invention is identical with the previously described bubble assembly, and is similarly positioned and secured to the bottom 45 of the receptacle 40 for movement from the horizontal position shown in Figure 10 to the vertical position with respect to the bottom 45 of the receptacle, as shown in Figure 11. The bubble assembly is indicated generally by the reference numeral 46.

In each of the forms of the invention herein shown and described, the upper face of the lower section 32 consisting of a flat circumferential portion for abutment with the upper section 31 and a concave portion forming with the plane of said flat portion a solid figure of volume equal to the desired bubble, and the radius of curvature of the concavity of the upper section of such length as to form, during the assembly of the bubble assembly, a bubble of an area to register with any of the scale markings without overlapping the adjacent scale markings. The bubble is, of course, air or an inert gas, and the liquid is water, alcohol, or a mixture of the same, or any other suitable liquid commonly in use in levels.

What is claimed is:

1. The combination with a portable electric drill having a housing including a top and opposed ends, a drill chuck projecting longitudinally from one of the ends of said housing and a pistol-type hand grip on the other of the ends of said housing, of a level attachment comprising a shallow receptacle including a flat bottom and an upstanding wall extending about the perimeter of said bottom horizontally disposed between said drill chuck and said hand grip so that the wall of the receptacle faces away from the top of the housing with the bottom of the receptacle supported upon the top of the housing, detachable means securing said receptacle to the top of said housing, a flat horizontally disposed support plate positioned within said receptacle and resting upon and fixedly secured to the bottom of said receptacle, said support plate having a portion spaced from said receptacle wall, a bubble assembly disposed horizontally within said receptacle, said assembly comprising a flat base plate of a size substantially the same as that of said support plate, an upstanding lower concave section and an inverted upper concave section superimposed upon and having the lower face abutting the upper face of said lower section providing a closed cavity carried by said flat base plate and a viewing glass carrying a center line marking and a plurality of angle scale markings on each side of said center line marking bridging the upper end portion of said cavity, and said bubble assembly having a base plate adjacent said support plate with the viewing glass adjacent the top of the receptacle wall, and means connecting the portion of said support plate spaced from the receptacle wall to the adjacent portion of said flat base plate for bodily movement of said bubble assembly from a horizontal position to a vertical position with respect to said support plate, said bubble assembly having a liquid body substantially filling said cavity and a bubble on and movable along the surface of said liquid body adjacent the upper well portion of said cavity, the upper face of the lower section consisting of a flatt circumferential portion for abutment with the upper section and a concave portion forming with the plane of said flat portion a solid figure of volume equal to the desired bubble, and the radius of curvature of the concavity of the upper section being of a length such as to form a bubble of an area to register with any of said scale markings without overlapping an adjacent scale marking.

2. The combination with a portable electric drill having a housing including a top and opposed ends, a drill chuck projecting longitudinally from one of the ends of said housing, and a pistol-type hand grip on the other of the ends of said housing, there being vent slots extending in opposed sides of the top of said housing intermediate the drill chuck and the hand grip, of a level attachment comprising a shallow receptacle including a flat bottom and an upstanding wall extending about the perimeter of said bottom horizontally disposed between said drill chuck and said hand grip so that the wall of the receptacle faces away from the top of the housing with the bottom of the receptacle supported upon the top of said housing, clamp elements carried by said receptacle and detachably engaged with said vent slot securing said receptacle to the top of said housing, a flat horizontally disposed support plate positioned within said receptacle and resting upon and fixedly secured to the bottom of said receptacle, said support plate having a portion spaced from said receptacle wall, a bubble assembly disposed horizontally within said receptacle, said assembly comprising a flat base plate of a size substantially the same as that of said support plate an upstanding lower concave section and an inverted upper concave section superimposed upon and having the lower face abutting the upper face of said lower section providing a closed cavity carried by said flat base plate and a viewing glass carrying a center line marking and a plurality of angle scale markings on each side of said center line marking bridging the upper end portion of said cavity, and said bubble assembly having the base plate adjacent said support plate with the viewing glass adjacent the top of the receptacle wall, and means connecting the portion of said support plate spaced from the receptacle wall to the adjacent portion of said flat base plate for bodily movement of said bubble assembly from the horizontal position to a vertical position with respect to said support plate, said bubble assembly having a liquid body substantially filling said cavity and a bubble on and movable along the surface of said liquid body adjacent the upper wall portion of said cavity, the upper face of the lower section consisting of a flat circumferential portion for abutment with the upper section and a concave portion forming with the plane of said flat portion a solid figure of volume equal to the desired bubble, and the radius of curvature of the concavity of the upper section being of a length such as to form a bubble of an area to register with any of said scale markings without overlapping of adjacent scale markings.

3. The combination with a portable electric drill having a housing including a top and opposed ends, a drill chuck projecting longitudinally from one of the ends of said housing, and a pistol-type hand grip on the other of the ends of said housing, there being a well formed in the top of said housing intermediate said drill chuck and said hand grip, of a level attachment comprising a shallow receptacle including a flat bottom and an upstanding wall extending about the perimeter of said bottom horizontally disposed between said drill chuck and said hand grip so that the receptacle sits within said housing well with the wall of the receptacle facing away from the well, detachable means securing said receptacle to the top of said housing, a flat horizontally disposed support plate positioned within said receptacle and resting upon and fixedly secured to the bottom of said receptacle, said support plate having a portion spaced from said receptacle wall, a bubble assembly disposed horizontally within said receptacle, said assembly comprising a flat base plate of a size substantially the same as that of said support plate, an upstanding lower concave section and an inverted upper concave section superimposed upon and having the lower face abutting the upper face of said lower section providing a closed cavity carried by said flat base plate and a viewing glass carrying a center line marking and a plurality of angle scale markings on each side of said center line marking bridging the upper end portion of said cavity, and said bubble assembly having the base plate adjacent said support plate with the viewing glass adjacent the top of the receptacle wall, and means connecting the portion of said support plate spaced from the receptacle wall to the adjacent portion of said flat base plate for bodily movement of said bubble assembly from the horizontal position to a vertical position with respect to said support plate, said bubble assembly having a liquid body substantially filling said cavity and a bubble on and movable along the surface of said liquid body adjacent the upper wall portion of said cavity, the upper face of the lower section consisting of a flat circumferential portion for abutment with the upper section and a concave portion forming with the plane of said flat portion a solid figure of volume equal to the desired bubble, and the radius of curvature of the concavity of the upper section being of a length such as to form a bubble of an area to register with any of said scale markings without overlapping of adjacent scale markings.

References Cited in the file of this patent

UNITED STATES PATENTS

| | | |
|---|---|---|
| 1,221,738 | Isom | Apr. 3, 1917 |
| 1,333,559 | Moulton | Mar. 9, 1920 |
| 2,525,387 | Volk | Oct. 10, 1950 |
| 2,757,458 | Zipser | Aug. 7, 1956 |